(12) United States Patent
Merlet et al.

(10) Patent No.: US 11,745,849 B2
(45) Date of Patent: *Sep. 5, 2023

(54) AIRCRAFT PORTION WITH REDUCED WAVE DRAG

(71) Applicant: DASSAULT AVIATION, Paris (FR)

(72) Inventors: Aurélien Merlet, Achères (FR); Zdenek Johan, Garches (FR); Ximun Loyatho, Boulogne-Billancourt (FR); Gilbert Roge, Deuil la Barre (FR)

(73) Assignee: DASSAULT AVIATION, Paris (FR)

( * ) Notice: Subject to any disclaimer, the term of this patent is extended or adjusted under 35 U.S.C. 154(b) by 0 days.

This patent is subject to a terminal disclaimer.

(21) Appl. No.: 17/560,625

(22) Filed: Dec. 23, 2021

(65) Prior Publication Data

US 2022/0111947 A1    Apr. 14, 2022

Related U.S. Application Data

(63) Continuation of application No. 16/261,486, filed on Jan. 29, 2019, now Pat. No. 11,267,552.

(30) Foreign Application Priority Data

Feb. 14, 2018  (FR) .................................. FR 18 00132

(51) Int. Cl.
*B64C 3/14* (2006.01)
*B64C 7/00* (2006.01)
(Continued)

(52) U.S. Cl.
CPC ................. *B64C 3/14* (2013.01); *B64C 1/26* (2013.01); *B64C 3/32* (2013.01); *B64C 7/00* (2013.01);
(Continued)

(58) Field of Classification Search
CPC ...... B64C 1/0009; B64D 27/08; B64D 27/14; B64D 27/20
See application file for complete search history.

(56) References Cited

U.S. PATENT DOCUMENTS 2,927,749 A    3/1960  Brownell
8,016,233 B2   9/2011  Moore et al.
(Continued)

FOREIGN PATENT DOCUMENTS

EP          1918194 A2    5/2008

OTHER PUBLICATIONS

S.S. Samant and N.J. Yu, Flow Prediction for Propfan Engine installation Effects on Transport Aircraft at Transonic Speeds, Jan. 1986, NASA contractor Report 3954 (Year: 1986).*
(Continued)

*Primary Examiner* — Richard Green
*Assistant Examiner* — Madison Elizabeth Dittner
(74) *Attorney, Agent, or Firm* — Davidson, Davidson & Kappel, LLC

(57) ABSTRACT

An aircraft portion includes a fuselage oriented in a longitudinal direction, an airfoil made up of at least one pair of wings arranged on either side of the fuselage in a transverse direction orthogonal to the longitudinal direction, and an airfoil-fuselage junction fairing at the interface between the airfoil and the fuselage. The junction fairing has, in a vertical plane, a lower profile and, in a horizontal plane, a horizontal profile at the junction of the outer surface of the junction fairing with the convex side of each wing. The horizontal profile and/or the lower profile successively has, in the longitudinal direction, a convex front segment, a concave intermediate segment, and a convex rear segment.

18 Claims, 3 Drawing Sheets

(51) Int. Cl.
*B64C 1/26* (2006.01)
*B64C 23/04* (2006.01)
*B64C 3/32* (2006.01)

(52) U.S. Cl.
CPC ........ *B64C 23/04* (2013.01); *B64C 2003/149* (2013.01)

(56) References Cited

U.S. PATENT DOCUMENTS

| | | |
|---|---|---|
| 8,177,170 B2 | 5/2012 | Fol et al. |
| 8,196,860 B2 * | 6/2012 | Gall ....................... B64D 27/14 244/1 N |
| 8,820,676 B2 | 9/2014 | Cazals et al. |
| 8,991,768 B1 | 3/2015 | Chase et al. |
| 2009/0078830 A1 | 3/2009 | Fol et al. |
| 2011/0204185 A1 | 8/2011 | Lyons |
| 2012/0043429 A1 | 2/2012 | Tracy et al. |

OTHER PUBLICATIONS

Corresponding Search Report for FR1800132.

\* cited by examiner

AIRCRAFT PORTION WITH REDUCED WAVE DRAG

CROSS-REFERENCE TO RELATED APPLICATIONS

This is a continuation of U.S. patent application Ser. No. 16/261,486, claiming the benefit of French Application No. 18 00132, filed on 14 Feb. 2018, which are both hereby incorporated herein by reference in their entirety.

The present disclosure relates to an aircraft portion, of the type comprising a fuselage oriented in a longitudinal direction and having a median longitudinal plane, an airfoil formed by at least one pair of wings positioned on either side of the fuselage in a transverse direction orthogonal to the median longitudinal plane, and an airfoil-fuselage junction fairing at the interface between the airfoil and the fuselage, said junction fairing having an outer surface and being delimited in a vertical direction orthogonal to the longitudinal and transverse directions by an envelope surface such that, at each point of said envelope surface, a transverse generatrix passes contained in said envelope surface and flush with the junction fairing, the projection of said envelope surface in the median longitudinal plane drawing a lower profile of the junction fairing, and the convex side of each wing being in contact with said outer surface of the junction fairing along a junction line, the orthogonal projection of which in a projection plane orthogonal to the median longitudinal plane draws a horizontal profile of said junction line.

BACKGROUND

Subsonic airplanes are known with low wings comprising an airfoil-fuselage junction fairing at the interface between their airfoil and their fuselage, said fairing covering the wing root by which the airfoil is connected to the fuselage. This junction fairing has an outer surface, the shape of which is studied to favor the flow of air and thus to avoid aerodynamic disruptions to the wing root. This fairing is generally also used to house certain systems of the airplanes such as pneumatic and/or hydraulic ducts, as well as the landing gear.

The shape of the outer surface of these junction fairings is typically designed so as to minimize the aerodynamic interactions of said fairing with the airfoil. This yields junction fairings whereof:
- the outer surface is in contact with the convex side of each wing of the aircraft along a junction line whose horizontal profile is slightly convex, nearly straight, and
- the vertical profile of the lower surface of the junction fairing is also slightly convex, nearly straight.

These known airplanes are not, however, fully satisfactory. It is in fact common for these subsonic airplanes to be suitable for moving at paces close enough to the speed of sound for the airflow around the wings of these airplanes to enter a transonic state, creating shock waves on the convex side, or even in some cases on the concave side, which increase the drag of the airplane by generating what is commonly called a "wave drag".

SUMMARY

One aim of the prevent disclosure is to use the airfoil-fuselage junction fairing to reduce the wave drag of the aircraft.

To that end, an aircraft portion of the aforementioned type is provided, wherein the horizontal profile of at least one of the junction lines and/or the lower profile of the junction fairing successively has, in the longitudinal direction, a convex front segment, a concave intermediate segment, and a convex rear segment.

According to specific embodiments of the invention, the aircraft portion also has one or more of the following features, considered alone or according to any technically possible combination(s):
- the wing has a leading edge and a trailing edge, the intersection between the leading edge and the outer surface of the junction fairing defining a front reference point, the intersection between the trailing edge and the longitudinal plane passing through said front reference point defining a rear reference point, and the distance between the front and rear reference points making up a reference length, and the front segment of the horizontal profile comprises a front convexity apex, the intermediate segment of the horizontal profile comprises an intermediate concavity bottom, and the rear segment of the horizontal profile comprises a rear convexity apex, the tangent to the horizontal profile of each of said convexity apices and concavity bottom being parallel to the longitudinal direction, the intermediate concavity bottom being withdrawn toward the median longitudinal plane relative to each of the front and rear convexity apices,
- the bottom of the intermediate concavity has a first primary longitudinal deviation relative to the front convexity apex, said first primary longitudinal deviation being between 15 and 45% of the reference length, preferably between 25 and 35% of said reference length,
- the bottom of the intermediate concavity has a first secondary longitudinal deviation relative to the rear convexity apex, said first secondary longitudinal deviation being between 35 and 65% of the reference length, preferably between 45 and 60% of said reference length,
- the bottom of the intermediate concavity has a primary transverse deviation relative to the front convexity apex, said primary transverse deviation being between 0.5 and 2.5% of the reference length, preferably between 1.0 and 2.0% of the reference length,
- the bottom of the intermediate concavity has a secondary transverse deviation relative to the rear convexity apex, said secondary transverse deviation being between 2.0 and 4.5% of the reference length, preferably between 2.5 and 4.0% of the reference length,
- the front convexity apex is at a first primary longitudinal distance from the front reference point of between 5 and 20% of the reference length,
- the intermediate concavity apex is at a first secondary longitudinal distance from the front reference point of between 35 and 50% of the reference length,
- the rear convexity apex is at a first tertiary longitudinal distance from the front reference point of between 85 and 100% of the reference length,
- the front convexity apex is at a primary transverse distance from the front reference point of between 0.0 and 1.0% of the reference length,
- the intermediate concavity bottom is at a secondary transverse distance from the front reference point of between 0.5 and 2.0% of the reference length,
- the rear convexity apex is at a tertiary transverse distance from the front reference point of between 1.5 and 3.0% of the reference length, preferably of between 2.0 and 2.5% of the reference length, each point of the junction line has a single orthogonal projection, specific to said point, over the segment connecting the front and rear reference points, the junction line is at least of class $C^2$, the front segment of the lower profile comprises a front curve apex and the lower profile has, at the interface between the intermediate region and the rear region, an inflection point, the tangent to the lower profile at said front curve apex and inflection point being parallel to the longitudinal direction, the inflection point being withdrawn toward the fuselage relative to the front curve apex, the inflection point has a second primary longitudinal deviation relative to the front curve apex, said second primary longitudinal deviation being between 40 and 55% of the reference length, preferably between 42 and 51% of said reference length, the inflection point has a vertical deviation relative to the front curve apex, said vertical deviation being between 1.0 and 2.5% of the reference length, preferably between 1.4 and 2.2% of the reference length, the front curve apex is at a second primary longitudinal distance from the front reference point of between 35 and 45% of the reference length, preferably of between 37 and 42% of said reference length; and the inflection point is at a second secondary longitudinal distance from the front reference point of between 80 and 90% of the reference length, preferably of between 83 and 88% of said reference length.

An airplane is also provided comprising an aircraft portion as defined above and a powertrain arranged at a rear end of the fuselage.

According to one particular embodiment of the invention, the airplane is a business jet.

BRIEF DESCRIPTION OF THE DRAWINGS

Other features and advantages of the invention will appear upon reading the following description, provided solely as an example and done in reference to the appended drawings, in which.

DETAILED DESCRIPTION

Figure 1:
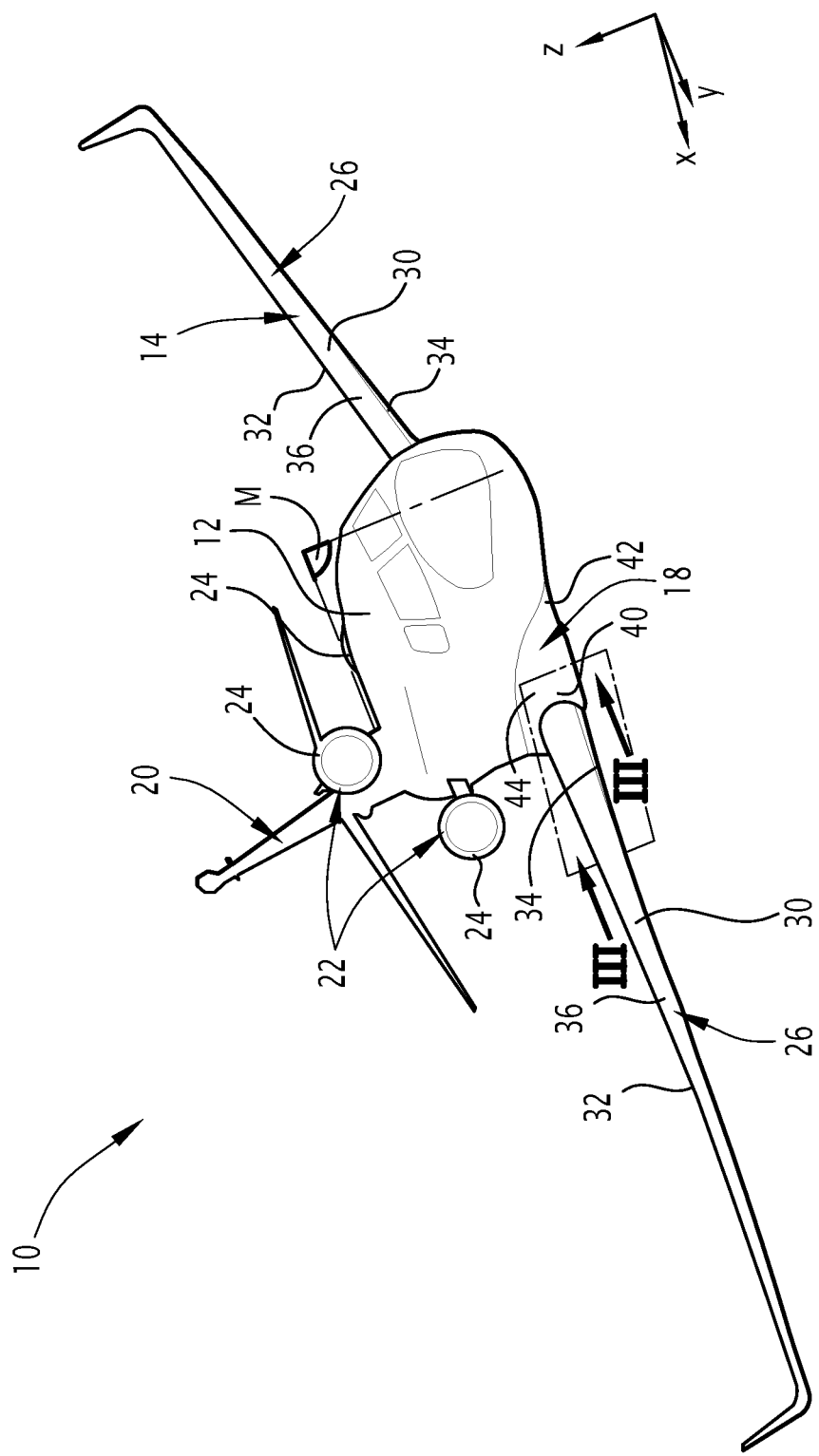
FIG. 1 is a perspective view of an aircraft including an aircraft portion according to an embodiment of the invention.

The aircraft 10 of FIG. 1 is a low-wing airplane. It comprises, in a known manner, a fuselage 12, an airfoil 14, and an airfoil-fuselage junction fairing 18 at the interface between the airfoil 14 and the fuselage 12. The aircraft 10 also comprises an empennage 20 and a powertrain 22.

The aircraft 10 is in particular a business jet having a maximum number of passengers allowed on board (PAX) less than or equal to 19.

Hereinafter, the reference terms are understood with respect to the usual orthogonal coordinate system in aircraft, which is shown in the Figures, and in which one distinguishes:

a longitudinal direction X, oriented from the front to the back of the aircraft, a transverse direction Y, oriented from the left to the right of the aircraft, said transverse direction Y forming, with the longitudinal direction X, a horizontal plane (X, Y), and a vertical direction Z oriented from the bottom to the top, said vertical direction Z forming:
with the longitudinal direction X, a longitudinal plane (X, Z), and
with the transverse direction Y, a transverse plane (Y, Z).

The fuselage 12 is elongated in the longitudinal direction X. It is in particular cylindrical and is centered on a longitudinal axis forming the axis of the fuselage 12.

The fuselage 12 has a median longitudinal plane M extending in the longitudinal X and vertical Z directions, said plane M in particular forming a plane of symmetry of the fuselage 12. This median longitudinal plane M also forms a median longitudinal plane of the aircraft 10, which is advantageously globally symmetrical relative to said plane M.

The powertrain 22 is in particular arranged at a rear end of the fuselage 12. Here it is formed by three turbojet engines 24. In the illustrated example, two turbojet engines 24 are thus arranged transversely on either side of the fuselage 12, behind the airfoil 14, and the third turbojet engine 24 is housed in the empennage 20.

The airfoil 14 is formed by a pair of wings 26 arranged on either side of the fuselage 12 in the transverse direction Y. These wings 26 are in particular arranged symmetrically relative to one another with respect to the median longitudinal plane M. Optionally, the airfoil 14 also comprises at least one other pair of wings.

Each wing 26 is mounted on the fuselage 12 at a wing root. This wing root is located in a lower half of the fuselage 12, in particular in a lower quarter of the fuselage 12.

Each wing 26 has a leading edge 30 and a trailing edge 32.

The leading edge 30 is made up of the front end line of the wing 26. In other words, the leading edge 30 is made up of a line whereof each point constitutes a front end of the longitudinal section of the wing 26 passing through that point.

The trailing edge 32 is made up of the rear end line of the wing 26. In other words, the trailing edge 32 is made up of a line whereof each point constitutes a rear end of the longitudinal section of the wing 26 passing through that point.

Each wing 26 also has a concave side 34 and a convex side 36. The concave side 34 is formed by the outer surface of the wing 26 extending from the leading edge 30 to the trailing edge 32, below the wing 26. The convex side 36 is formed by the outer surface of the wing 26 extending from the leading edge 30 to the trailing edge 32, above the wing 26.

The airfoil-fuselage junction fearing 18 comprises two side portions 40 each covering the wing root of a respective wing 26, and a central portion 42 connecting the side portions 34 to one another while extending below the fuselage 12.

The airfoil-fuselage junction fairing 18 has an outer surface 44 oriented away from the fuselage 12. This outer surface 44 extends continuously over the side portions 40 and over the central portion 42. It is at least of class $C^2$.

Figure 2:
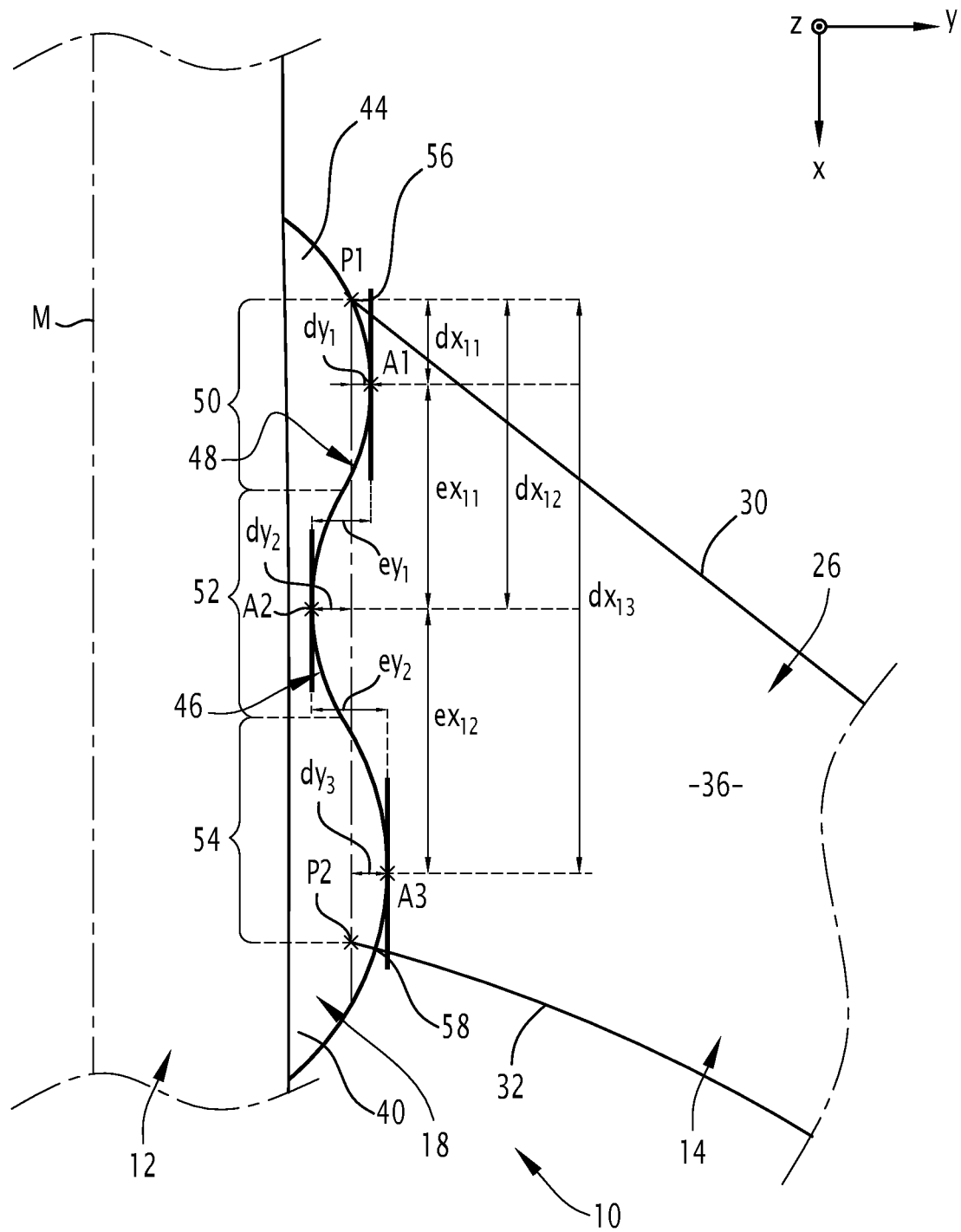
FIG. 2 is a top view of a part of the aircraft according to FIG. 1.

In reference to FIG. 2, for each wing 26, the leading edge 30 of said wing 26 has an intersection with the outer surface 44 of the junction fairing 18; this intersection defines a front reference point P1. Furthermore, the trailing edge 32 of the wing 26 has an intersection with the longitudinal plane passing through the first reference point P1; this intersection defines a rear reference point P2. The segment connecting the points P1 and P2 constitutes a chord from the wing 26 to the wing root, and the distance from P1 to P2 constitutes a chord length L (FIG. 3) from the wing 26 to the wing root. This chord length L is referred to hereinafter as "reference length".

Still in reference to FIG. 2, the convex side 36 of each wing 26 is in contact with the outer surface 44 of the junction fairing 18 along a junction line 46. This junction can be clean or defined by a fillet having a minimum curve radius at said junction line 46. This junction line 46 is at least of class $C^2$.

Each point of the junction line 46 has a single orthogonal projection, specific to said point, over the segment connecting the front and rear reference points P1, P2. There is thus a bijective application linking the points of the junction line 46 to the segment connecting the front and rear reference points P1, P2.

The orthogonal projection of the junction line 46 in a horizontal projection plane draws a horizontal profile 48 of said junction line 46 successively having, in the longitudinal direction X, a front segment 50, an intermediate segment 52, and a rear segment 54, each of said segments 50, 52, 54 being continuous.

These segments 50, 52, 54 are alongside one another; in other words, the horizontal profile 48 does not comprise a segment inserted between two of said segments 50, 52, 54. Furthermore, the front segment 50 defines a front end 56 of the horizontal profile 48, combined with the first reference point P1, and the rear segment 52 defines a rear end 58 of the horizontal profile 48. Thus, the horizontal profile 48 is made up of the segments 50, 52, 54.

The front segment 50 is convex, the intermediate segment 52 is concave, and the rear segment 54 is convex. It will be noted that the adjectives "convex" and "concave" are understood here and hereinafter relative to an observation from the outside of the aircraft 10; thus, a segment described as "convex" extends away from the median longitudinal plane M relative to the segment connecting the longitudinal ends of said segment, and a segment described as "concave" extends between the median longitudinal plane M and the segment connecting the longitudinal ends of said segment. Furthermore, each of the segments 50, 52, 54 has no inflection point, with the exception of the junction points between said segments 50, 52, 54.

To make the drawings easier to read, the concave and convex appearances of the segments 50, 52, 54 have been accentuated in FIG. 2.

The front segment 50 comprises a front convexity apex A1 such that the tangent to the horizontal profile 48 at said apex A1 is parallel to the longitudinal direction X. Likewise, the intermediate segment 52 comprises an intermediate concavity bottom A2 such that the tangent to the horizontal profile 48 at said bottom A2 is parallel to the longitudinal direction X, and the rear segment 54 comprises a rear convexity apex A3 such that the tangent to the horizontal profile 48 at said apex A3 is parallel to the longitudinal direction X. The intermediate concavity bottom A2 is arranged withdrawn toward the median longitudinal plane M relative to each of the front and rear convexity apices A1, A3, i.e., the intermediate concavity bottom A2 is closer to the median longitudinal plane M than each of the front and rear convexity apices A1, A3.

In particular, the front convexity apex A1 is at a first primary longitudinal distance $dx_{11}$ from the front reference point P1 of between 5 and 20% of the reference length L, the intermediate concavity bottom A2 is at a first secondary longitudinal distance $dx_{12}$ from the front reference point P1 of between 35 and 50% of the reference length L, and the rear convexity apex A3 is at a first tertiary longitudinal distance $dx_{13}$ from the front reference point P1 of between 85 and 100% of the reference length L.

Furthermore, the intermediate concavity bottom A2 has a first primary longitudinal deviation exit relative to the front convexity apex A1 advantageously of between 15 and 45% of the reference length, for example of between 25 and 35% of the reference length L, and a first secondary longitudinal deviation exit relative to the rear convexity apex A3 advantageously of between 35 and 65% of the reference length L, for example of between 45 and 60% of the reference length L.

Furthermore, the intermediate concavity bottom A2 has a primary transverse deviation $ey_1$ relative to the front convexity apex A1 preferably of between 0.5 and 2.5% of the reference length L, for example of between 1.0 and 2.0% of the reference length L, and a secondary transverse deviation eye relative to the rear convexity apex A3 preferably of between 2.0 and 4.5% of the reference length L, for example of between 2.5 and 4.0% of the reference length L.

To that end, the front convexity apex A1 is typically placed at a primary transverse distance $dy_1$ from the front reference point P1 of between 0.0 and 1.0% of the reference length L, protruding away from the median longitudinal plane M relative to said point P1, the intermediate concavity bottom A2 at a secondary transverse distance dye from the front reference point P1 of between 0.5 and 2.0% of the reference length L, withdrawn toward the median longitudinal plane M relative to said point P1, and the rear convexity apex A3 at a tertiary transverse distance $dy_3$ from the front reference point P1 of between 1.5 and 3.0% of the reference length L, protruding away from the median longitudinal plane M relative to said point P1.

Advantageously, the ratio between the deviations $ey_1$ and exit is between 0.035 and 0.060.

Also advantageously, the ratio between the deviations $ey_2$ and $ex_{12}$ is between 0.055 and 0.065.

According to one particularly preferred embodiment of the invention, the ratio $(ey_2 \times ex_{11})/(ex_{12} \times ey_1)$ is between 1.15 and 1.45.

It has been noted that this particular shape of the horizontal profile 48 of the junction lines 46 makes it possible to significantly reduce the force of the shockwaves on the convex side of the airfoil, and thus the wave drag of the aircraft. One in fact observes, owing to this particular shape alone, a gain of 1 to 2% of the overall drag of the aircraft 10 when it goes to a Mach number greater than or equal to a MMO-0.05, MMO being the maximum authorized Mach during operation of the aircraft 10.

Figure 3:
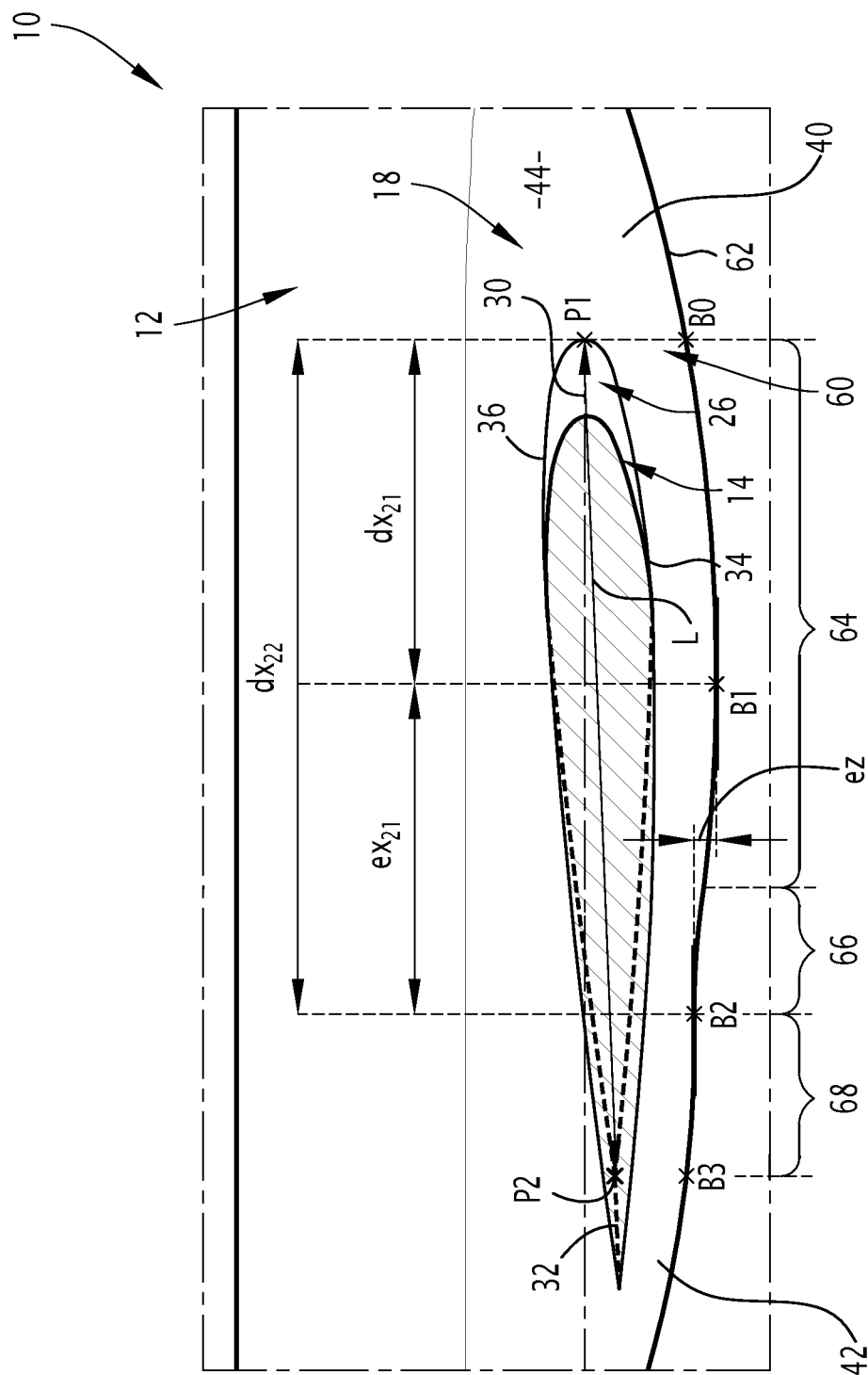
FIG. 3 is a side view of a part of the aircraft of FIG. 1, along a section plane marked III in FIG. 1.

In reference to FIG. 3, the junction fairing 18 is delimited in the vertical direction Z by an envelope surface 60 such that, at each point of said envelope surface 60, a transverse generatrix passes contained in said envelope surface 60 and flush with the junction fairing 18. The projection of said envelope surface 60 in the median longitudinal plane M draws a lower profile 62 of the junction fairing 18.

The lower profile 62 successively has, in the longitudinal direction X, a front region 64, an intermediate region 66, and a rear region 68, each of said regions 64, 66, 68 being continuous, the front region 64 having a front end B0 that is substantially vertically aligned with the front reference point P1 and the rear region 68 having a rear end B3 that is substantially vertically aligned with the rear reference point P2.

These regions 64, 66, 68 are alongside one another; in other words, the lower profile 62 does not comprise a segment inserted between two of said regions 64, 66, 68.

The portion of the lower profile 62 formed by the meeting of the regions 64, 66, 68 has a longitudinal extension equal to the longitudinal extension of the chord of the wings 26 at the wing root.

In the illustrated example, the front region 64 is convex, the intermediate region 66 is concave, and the rear region 68 is convex. It will be noted that the adjectives "convex" and "concave" are understood here and still relative to an observation from the outside of the aircraft 10; thus, a region described as "convex" extends away from the fuselage 12 relative to the segment connecting the longitudinal ends of said region, and a region described as "concave" extends between the fuselage 12 and the segment connecting the longitudinal ends of said region. Furthermore, each of the regions 64, 66, 68 has no inflection point, with the exception of the junction points between said regions 64, 66, 68.

To make the drawings easier to read, the concave and convex appearances of the regions 64, 66, 68 have been accentuated in FIG. 3.

The front region 64 comprises a front curve apex B1 such that the tangent to the lower profile 62 at said apex B1 is parallel to the longitudinal direction X. Furthermore, the lower profile 62 has, at the interface between the intermediate region 66 and the rear region 68, an inflection point B2 such that the tangent to the lower profile 62 at said inflection point B2 is substantially parallel to the longitudinal direction X. The inflection point B2 is arranged withdrawn toward the fuselage 12 relative to the front curve apex B1, i.e., the inflection point B2 is closer to the fuselage 12 than the front curve apex B1.

In particular, the front curve apex B1 is at a second primary longitudinal distance $dx_{21}$ from the front reference point P1 of between 35 and 45% of the reference length L, in particular of between 37 and 42% of said length L, and the inflection point B2 is at a second secondary longitudinal distance $dx_{22}$ from the front reference point P1 of between 80 and 90% of the reference length L, in particular of between 83 and 88% of said length L.

Furthermore, the inflection point B2 has a second primary longitudinal deviation $ex_{21}$ relative to the front curve apex B1 advantageously of between 40 and 55% of the reference length L, for example of between 42 and 51% of the reference length L.

Furthermore, the inflection point B2 has a vertical deviation ez relative to the front curve apex B1 preferably of between 1.0 and 2.5% of the reference length L, for example between 1.4 and 2.2% of the reference length L.

Advantageously, the ratio between the deviations ez and $ex_{21}$ is between 0.030 and 0.045, for example between 0.035 and 0.042.

It has been noted that this particular shape of the vertical profile of the lower surface of the junction fairing 18 makes it possible to reduce the force of the shockwaves on the concave side of the airfoil, and thus the wave drag of the aircraft. One in fact observes that this alone allows a gain of about 1% of the overall drag of the aircraft 10 when it goes to a Mach number greater than or equal to a MMO-0.025, MMO being the maximum authorized Mach during operation of the aircraft 10. When it is combined with the specific shape of the horizontal profile of the junction line 46 described above, it is thus a gain of nearly 3% of the overall drag of the aircraft 10 that can be achieved.

Owing to the above disclosure, the wave drag of the aircraft 10 is reduced, which allows a significant increase in the performance of the aircraft, in particular in terms of fuel consumption and action radius.

What is claimed is:

1. An aircraft portion, comprising:
   a fuselage oriented in a longitudinal direction and having a median longitudinal plane;
   an airfoil formed by at least one pair of wings positioned on either side of the fuselage in a transverse direction orthogonal to the median longitudinal plane; and
   an airfoil-fuselage junction fairing at an interface between the airfoil and the fuselage, the junction fairing having an outer surface and being delimited in a vertical direction orthogonal to the longitudinal and transverse directions by an envelope surface, a projection of the envelope surface in the median longitudinal plane drawing a lower profile of the junction fairing, and a convex side of each wing being in contact with the outer surface of the junction fairing along a junction line, an orthogonal projection of which in a projection plane orthogonal to the median longitudinal plane draws a horizontal profile of the junction line, wherein the horizontal profile of at least one of the junction lines has, in the longitudinal direction, a convex front segment, a concave intermediate segment, and a convex rear segment and/or the lower profile of the junction fairing successively has, in the longitudinal direction, a convex front segment, a concave intermediate segment, and a convex rear segment,
   wherein at least one of the wings has a leading edge and a trailing edge, an intersection between the leading edge and the outer surface of the junction fairing defining a front reference point, the intersection between the trailing edge and the longitudinal plane passing through the front reference point defining a rear reference point, and a distance between the front and rear reference points making up a reference length,
   the front reference point being located on the convex front segment,
   wherein the convex front segment of the horizontal profile comprises a front convexity apex, the concave intermediate segment of the horizontal profile comprises an intermediate concavity bottom, and the convex rear segment of the horizontal profile comprises a rear convexity apex, a tangent to the horizontal profile of each of the front convexity apex, the rear convexity apex and the concavity bottom being parallel to the longitudinal direction, the intermediate concavity bottom being withdrawn toward the median longitudinal plane relative to each of the front convexity apex and the rear convexity apex,
   wherein the intermediate concavity bottom is at a first secondary longitudinal distance from the front reference point of between 35 and 50% of the reference length.

2. The aircraft portion according to claim 1, wherein the intermediate concavity bottom has a first primary longitudinal deviation relative to the front convexity apex, the first primary longitudinal deviation being between 15 and 45% of the reference length.

3. The aircraft portion according to claim 1, wherein the intermediate concavity bottom has a first secondary longitudinal deviation relative to the rear convexity apex, the first secondary longitudinal deviation being between 35 and 65% of the reference length.

4. The aircraft portion according to claim 1, wherein the intermediate concavity bottom has a primary transverse deviation relative to the front convexity apex, the primary transverse deviation being between 0.5 and 2.5% of the reference length.

5. The aircraft portion according to claim 1, wherein the intermediate concavity bottom has a secondary transverse deviation relative to the rear convexity apex, the secondary transverse deviation being between 2.0 and 4.5% of the reference length.

6. The aircraft portion according to claim 1, wherein the front convexity apex is at a first primary longitudinal distance from the front reference point of between 5 and 20% of the reference length.

7. The aircraft portion according to claim 1, wherein the rear convexity apex is at a first tertiary longitudinal distance from the front reference point of between 85 and 100% of the reference length.

8. The aircraft portion according to claim 1, wherein the front convexity apex is at a primary transverse distance from the front reference point of between 0.0 and 1.0% of the reference length.

9. The aircraft portion according to claim 1, wherein the intermediate concavity bottom is at a secondary transverse distance from the front reference point of between 0.5 and 2.0% of the reference length.

10. The aircraft portion according to claim 1, wherein the rear convexity apex is at a tertiary transverse distance from the front reference point of between 1.5 and 3.0% of the reference length.

11. The aircraft portion according to claim 1, wherein each point of the junction line has a single orthogonal projection, specific to the point, over a segment connecting the front and rear reference points.

12. The aircraft portion according to claim 1, wherein the junction line is at least of class $C^2$.

13. The aircraft portion according to claim 1, wherein the convex front segment of the lower profile comprises a front curve apex and the lower profile has, at an interface between an intermediate region and a rear region, an inflection point, a tangent to the lower profile at the front curve apex and the inflection point being parallel to the longitudinal direction, the inflection point being withdrawn toward the fuselage relative to the front curve apex.

14. An aircraft portion, according to claim 1, wherein the intermediate concavity bottom has a primary transverse deviation relative to the front convexity apex, the intermediate concavity bottom has a secondary transverse deviation relative to the rear convexity apex, the secondary transverse deviation being smaller than the primary transverse deviation.

15. An airplane comprising:
the aircraft portion according to claim 1; and
a powertrain arranged at a rear end of the fuselage.

16. The airplane according to claim 15, wherein the airplane is a subsonic airplane in which the airflow around the wings moves close enough to the speed of sound to enter a transonic state.

17. An aircraft portion, comprising:
a fuselage oriented in a longitudinal direction and having a median longitudinal plane;
an airfoil formed by at least one pair of wings positioned on either side of the fuselage in a transverse direction orthogonal to the median longitudinal plane; and
an airfoil-fuselage junction fairing at an interface between the airfoil and the fuselage, the junction fairing having an outer surface and being delimited in a vertical direction orthogonal to the longitudinal and transverse directions by an envelope surface, a projection of the envelope surface in the median longitudinal plane drawing a lower profile of the junction fairing, and a convex side of each wing being in contact with the outer surface of the junction fairing along a junction line, an orthogonal projection of which in a projection plane orthogonal to the median longitudinal plane draws a horizontal profile of the junction line, wherein the horizontal profile of at least one of the junction lines has, in the longitudinal direction, a convex front segment, a concave intermediate segment, and a convex rear segment and/or the lower profile of the junction fairing successively has, in the longitudinal direction, a convex front segment, a concave intermediate segment, and a convex rear segment,
wherein at least one of the wings has a leading edge and a trailing edge, an intersection between the leading edge and the outer surface of the junction fairing defining a front reference point, the intersection between the trailing edge and the longitudinal plane passing through the front reference point defining a rear reference point, and a distance between the front and rear reference points making up a reference length,
the front reference point being located on the convex front segment,
wherein the convex front segment of the lower profile comprises a front curve apex and the lower profile has, at an interface between an intermediate region and a rear region, an inflection point, a tangent to the lower profile at the front curve apex and the inflection point being parallel to the longitudinal direction, the inflection point being withdrawn toward the fuselage relative to the front curve apex.

18. An aircraft portion, comprising:
a fuselage oriented in a longitudinal direction and having a median longitudinal plane;
an airfoil formed by at least one pair of wings positioned on either side of the fuselage in a transverse direction orthogonal to the median longitudinal plane; and
an airfoil-fuselage junction fairing at an interface between the airfoil and the fuselage, the junction fairing having an outer surface and being delimited in a vertical direction orthogonal to the longitudinal and transverse directions by an envelope surface, a projection of the envelope surface in the median longitudinal plane drawing a lower profile of the junction fairing, and a convex side of each wing being in contact with the outer surface of the junction fairing along a junction line, an orthogonal projection of which in a projection plane orthogonal to the median longitudinal plane draws a horizontal profile of the junction line, wherein the horizontal profile of at least one of the junction lines has, in the longitudinal direction, a convex front segment, a concave intermediate segment, and a convex rear segment and/or the lower profile of the junction fairing successively has, in the longitudinal direction, a convex front segment, a concave intermediate segment, and a convex rear segment,
wherein at least one of the wings has a leading edge and a trailing edge, an intersection between the leading edge and the outer surface of the junction fairing defining a front reference point, the intersection between the trailing edge and the longitudinal plane passing through the front reference point defining a rear reference point, and a distance between the front and rear reference points making up a reference length,
the front reference point being located on the convex front segment wherein the convex front segment of the horizontal profile comprises a front convexity apex, the concave intermediate segment of the horizontal profile comprises an intermediate concavity bottom, and the convex rear segment of the horizontal profile comprises a rear convexity apex, a tangent to the horizontal profile of each of the front convexity apex, the rear convexity apex and the concavity bottom being parallel to the longitudinal direction, the intermediate concavity bottom being withdrawn toward the median longitudinal plane relative to each of the front convexity apex and the rear convexity apex, wherein the intermediate concavity bottom has a primary transverse deviation relative to the front convexity apex, the intermediate concavity bottom has a secondary transverse deviation relative to the rear convexity apex, the secondary transverse deviation being smaller than the primary transverse deviation.

* * * * *